(12) United States Patent
Zhang

(10) Patent No.: US 11,220,643 B2
(45) Date of Patent: Jan. 11, 2022

(54) HYDROGEN GENERATION FURNACE USING DECOMPOSITION OF BIOMASS STREAM

(71) Applicant: Fujian Jungie New Material Technology Company Limited, Fujian (CN)

(72) Inventor: Daji Zhang, Fujian (CN)

(73) Assignee: Fujian JunGie New Material Technology Company Ltd., Ningde (CN)

( * ) Notice: Subject to any disclaimer, the term of this patent is extended or adjusted under 35 U.S.C. 154(b) by 181 days.

(21) Appl. No.: 16/792,223

(22) Filed: Feb. 15, 2020

(65) Prior Publication Data

US 2020/0239794 A1    Jul. 30, 2020

Related U.S. Application Data

(63) Continuation of application No. PCT/CN2018/000290, filed on Aug. 6, 2018.

(30) Foreign Application Priority Data

Aug. 14, 2017 (CN) .......................... 201710717224.8

(51) Int. Cl.
*C10J 3/74* (2006.01)
*C01B 3/02* (2006.01)
*C01B 3/04* (2006.01)

(52) U.S. Cl.
CPC ..................................... *C10J 3/74* (2013.01);
*C01B 3/02* (2013.01); *C01B 3/045* (2013.01);
*C10J 2200/09* (2013.01); *C10J 2300/092* (2013.01); *C10J 2300/1618* (2013.01)

(58) Field of Classification Search
CPC .... C10J 3/74; C10J 2200/09; C10J 2300/092; C10J 2300/1618; C01B 3/02; C01B 3/045
See application file for complete search history.

(56) References Cited

U.S. PATENT DOCUMENTS

| | | | | |
|---|---|---|---|---|
| 2,823,103 A | * | 2/1958 | Gruber | C10J 3/74 48/63 |
| 3,253,906 A | * | 5/1966 | Secord | C10J 3/74 75/658 |
| 4,098,586 A | * | 7/1978 | Woodmansee | C10J 3/38 110/167 |
| 4,137,051 A | * | 1/1979 | Godwin | C10J 3/38 110/247 |

(Continued)

*Primary Examiner* — Matthew J Merkling

(57) ABSTRACT

Disclosed is a hydrogen generation furnace using decomposition of biomass steam, which employs an infrared source and a furnace body with a water-accommodating structure. A steam separation-drying device is cylindrical and provided at an upper part of an interior of the furnace body and a cavity of the steam separation-drying device forms a secondary gasifier. A lattice plate is provided at a bottom of the interior of the furnace body. A lattice combustion grate is provided above a middle of the lattice plate. A steam distributor is provided outside a lower part of the furnace body. The furnace of the invention performs gasified gas separation as well as secondary oxidation and gasification and mixes steam with gas generated from biomass to perform a decomposition reaction for generating hydrogen.

4 Claims, 1 Drawing Sheet

(56) References Cited

U.S. PATENT DOCUMENTS

| | | | | |
|---|---|---|---|---|
| 4,385,905 A | * | 5/1983 | Tucker | C10J 3/66 |
| | | | | 422/211 |
| 4,436,530 A | * | 3/1984 | Child | C10J 3/466 |
| | | | | 252/373 |
| 5,554,202 A | * | 9/1996 | Brooker | C10J 3/485 |
| | | | | 422/111 |
| 5,895,508 A | * | 4/1999 | Halow | C10K 1/026 |
| | | | | 48/77 |
| 2005/0108940 A1 | * | 5/2005 | Schingnitz | C10J 3/74 |
| | | | | 48/101 |
| 2006/0101715 A1 | * | 5/2006 | Vlok | C10J 3/42 |
| | | | | 48/210 |
| 2009/0020456 A1 | * | 1/2009 | Tsangaris | C10J 3/523 |
| | | | | 208/133 |
| 2010/0284890 A1 | * | 11/2010 | Schmitt | C10J 3/42 |
| | | | | 423/418.2 |
| 2011/0243800 A1 | * | 10/2011 | Gallmetzer | F23C 10/18 |
| | | | | 422/146 |
| 2012/0159841 A1 | * | 6/2012 | Fan | C10J 3/725 |
| | | | | 44/457 |
| 2015/0090938 A1 | * | 4/2015 | Meyer | C10J 3/506 |
| | | | | 252/373 |
| 2020/0231885 A1 | * | 7/2020 | Zhang | F22B 31/04 |

\* cited by examiner

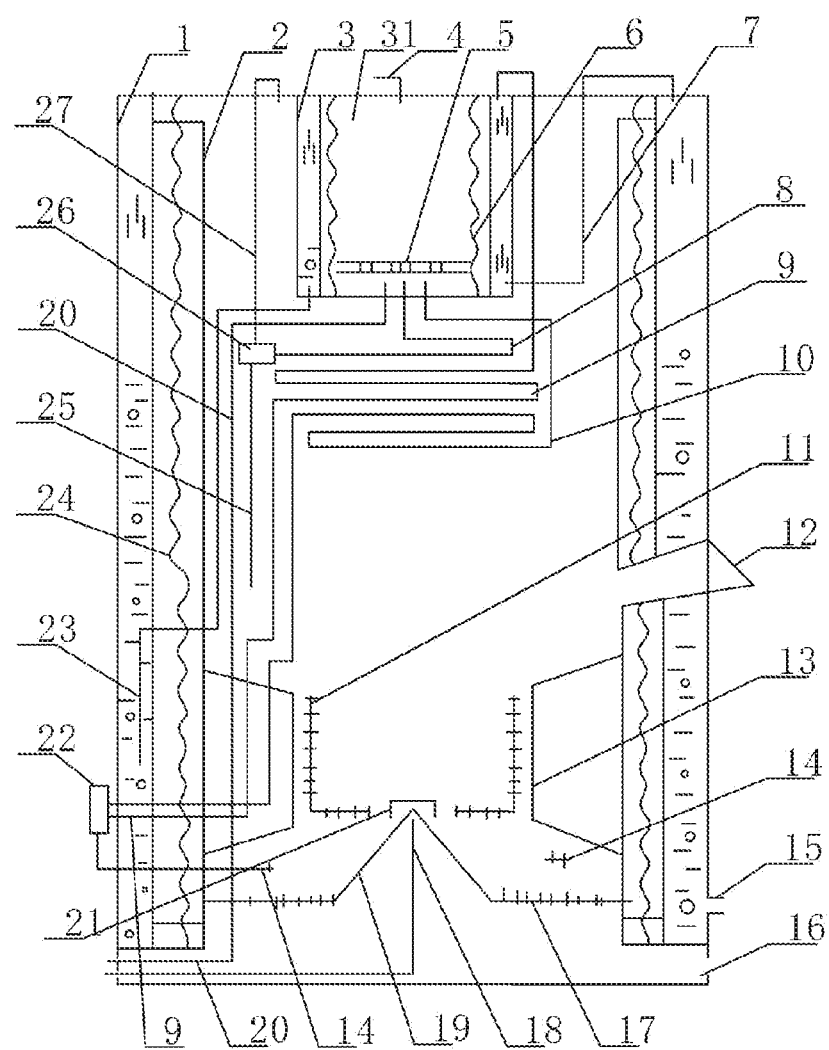

HYDROGEN GENERATION FURNACE USING DECOMPOSITION OF BIOMASS STREAM

CROSS-REFERENCE TO RELATED APPLICATIONS

This application is a continuation of International Patent Application No. PCT/CN2018/000290, filed on Aug. 6, 2018, which claims the benefit of priority from Chinese Patent Application No. 201710717224.8, filed on Aug. 14, 2017. The content of the aforementioned applications, including any intervening amendments thereto, are incorporated herein by reference.

TECHNICAL FIELD

The present application relates to a hydrogen generation furnace using decomposition of biomass steam, and more particularly to a multifunctional hydrogen generation furnace through biomass gasification and steam decomposition, where wood waste and agricultural waste are used as raw materials to produce gas, which is then mixed with steam to perform decomposition reaction for hydrogen generation, and the furnace converts energy and transfers the converted energy to a split system for supplying heat to meet various needs.

BACKGROUND OF THE INVENTION

Energy consumption increases with the development and progress in production and life, and attendant pollution problems gradually restrict the overall development of our society. In recent years, persistent efforts have been made to strengthen pollution control, ameliorate energy and seek pollution-free renewable and clean energy. Hydrogen energy turned out to be capable of changing the existing energy structure and achieving zero environmental impact. Among methods of preparing hydrogen, using plants as hydrogen sources as a method for producing renewable energy is highly anticipated, since the plants grow through fixing carbon dioxide and thus produce hydrogen without restrictions on carbon dioxide. In the prior art, a thermochemical gasification method employs a biomass gas producer or a stalk gasifying furnace, which uses agricultural residues as gasification raw materials. Due to ready availability and low cost of the agricultural residues, this method of producing hydrogen is always in use since it was developed more than ten years ago. However, the method uses low techniques although lots of improvements are provided. An advanced method for efficiently preparing hydrogen is still not found due to the following difficulties. Coal tar cannot be completely gasified; water vapor therein cannot be effectively decomposed and converted into hydrogen; autothermal combustion and gasification involve a large energy loss, low gasification efficiency and inefficient waste heat reuse; in particular, a gasification furnace body is susceptible to chemical damage, resulting in material waste and increased cost. For these reasons, the invention aims to completely overcome these shortcomings in the prior art and provide a technical solution to completely reach a decomposition reaction for fully generating hydrogen. The device provided herein is long-lasting, simple, convenient, low-cost, highly efficient, pollution-free and multifunctional. The device facilitates a decomposition reaction of mixed water vapor and upgrades the generated combustible gas in an environment of biomass gasified gas. Compared to gasified gas generated through biomass, more water vapor is converted to hydrogen, benefiting our society.

SUMMARY OF THE INVENTION

This invention provides a hydrogen generation furnace using decomposition of biomass steam, in order to achieve the objects mentioned above.

The technical solution of the invention is described as follows.

A hydrogen generation furnace using decomposition of biomass steam, comprising a double-walled furnace body, wherein an opening from which water enters and exits is provided at a lower part of the double-walled furnace body; a steam outlet is provided at a top of the double-walled furnace body; a grid-shaped pipe has a spaced interior and is provided along a circumference of an inner wall of the double-walled furnace body; the grid-shaped pipe is communicated with the double-walled furnace body to accommodate water; an infrared radiation grid layer is embedded between the grid-shaped pipe and the inner wall of the double-walled furnace body; a steam separation-drying device is cylindrical and double-walled and is provided in a middle of an upper part of an interior of the double-walled furnace body; a steam outlet is provided at a top of the steam separation-drying device; a steam inlet and a residual water outlet are provided at a lower part of the steam separation-drying device; a cylindrical infrared radiation grid layer is provided along a circumference of an inner wall of the steam separation-drying device; an infrared combustion radiation grid layer is provided at a lower part of an interior of the steam separation-drying device; a cavity of the steam separation-drying device forms a secondary gasifier; a gas outlet is provided in a middle of the top of the steam separation-drying device; a ceramic lattice plate is provided at a bottom of the interior of the double-walled furnace body and has a pyramid in a middle of the ceramic lattice plate; a tubular barrier is provided above the pyramid and is communicated with the grid-shaped pipe to accommodate water; a ceramic lattice combustion grate is provided along a circumference of an inner side of the tubular barrier. After biomass enters the ceramic lattice combustion grate, a gasifying agent and air gather at a lower part of the ceramic lattice combustion grate to enhance combustion and the ceramic lattice combustion grate glows red, thereby creating a radiation source formed by a flame and an infrared. Charcoals distributed on a flat base of the ceramic lattice plate burn and cooperate with the fire gathered in a middle of the ceramic lattice combustion grate to form an infrared radiation network of the double-walled furnace body, and the resulting infrared is reflected again to cooperate with the radiation source on the ceramic lattice combustion grate, thereby forming high-energy radiation sources to impart high temperature inside the double-walled furnace body. Gasifying agent steam rises with the tumbling heat wave inside the double-walled furnace body, so as to promote complete gasification of the biomass and offer a condition for decomposing water through infrareds, thereby achieving a decomposition reaction of steam mixed with the gasifying agent to produce mixed combustible gas predominated by hydrogen. The resulting gas is introduced again into the steam separation-drying device to touch the infrared combustion radiation grid layer and thus perform secondary gasification, which further facilitates the decomposition of the steam and complete gasification of tar, thereby improving the purity of the resulting hydrogen and the overall efficiency of the gasification.

In some embodiments, the ceramic lattice combustion grate is not provided inside the double-walled furnace body, which facilitates the use of woolen and foam wastes, broadening the range of available materials and reducing production costs. The grid-shaped pipe and the infrared radiation grid layer are not further provided inside the double-walled furnace body to leave the double-walled furnace body with only a gasification system inside, which simplifies the way of gasifying biomass, catering for various usage occasions. This simplification imparts less energy to steam decomposition, but the simplified device is industrialized with little engineering difficulty and manufactured with low cost to compensate for the shortcoming, improving efficiency and promoting overall development.

Compared to the prior art, this invention has the following benefits.

The double-walled furnace body employs an infrared source and a water-accommodating structure, where the infrared source is generated from dry and highly heated materials which not only generate various energy, such as infrared, ultraviolet, and light and electromagnetic energy, but also play multiple roles in keeping heat balance, insolating heat and drying the furnace body to protect the furnace body from chemical corrosion and thermal imbalance as well as prevent heat loss. The water-accommodating structure and the use of the grid-shaped pipe which is capable of accommodating water can help the furnace body mitigate the wear and tear and thus extend the service life. An existing single-function gasifier is updated to a multiple-function furnace for both gasification and heating water through steam. The multiple-function furnace provided herein can be applied in the heating industry by directly using steam, fire or fuel gas to supply heat in a split heating system, which offers a multipurpose heating solution to home, where kitchen cooking is provided with fuel gas, and hot water is provided through steam heating to meet regular daily needs. The furnace provided herein is simplified to be simple, low-cost and convenient, benefiting our society.

BRIEF DESCRIPTION OF THE DRAWINGS

This invention will be further described below with reference to the accompanying drawings.

FIG. 1 is a schematic diagram of a hydrogen generation furnace using decomposition of biomass steam according to an exemplary embodiment of the present invention.

DETAILED DESCRIPTION OF EMBODIMENTS

This invention provides a hydrogen generation furnace using decomposition of biomass steam, including a double-walled furnace body, where an opening from which water enters and exits 15 is provided at a lower part of the double-walled furnace body 1; a steam outlet is provided at a top of the double-walled furnace body 1; a grid-shaped pipe 2 has a spaced interior and is provided along a circumference of an inner wall of the double-walled furnace body 1; the grid-shaped pipe 2 is communicated with the double-walled furnace body 1 to accommodate water, an infrared radiation grid layer 24 is embedded between the grid-shaped pipe 2 and the inner wall of the double-walled furnace body 1; a steam separation-drying device 3 is cylindrical and double-walled and is provided in a middle of an upper part of an interior of the double-walled furnace body 1; a steam outlet is provided at a top of the steam separation-drying device 3; a steam inlet and a residual water outlet are provided at a lower part of the steam separation-drying device 3; a cylindrical infrared radiation grid layer 6 is provided along a circumference of an inner wall of the steam separation-drying device 3; an infrared combustion radiation grid layer 5 is provided at a lower part of an interior of the steam separation-drying device 3; a cavity of the steam separation-drying device forms a secondary gasifier 31; a gas outlet 4 is provided in a middle of the top of the steam separation-drying device 3; a ceramic lattice plate 17 is provided at a bottom of the interior of the double-walled furnace body 1 and has a pyramid 19 in a middle of the ceramic lattice plate 17; a first gasifying agent inlet pipe 18 is provided under the pyramid 19 of the ceramic lattice plate; a lighter 21 is provided above a vertex of the pyramid 19; a tubular barrier 13 is provided above the pyramid 19 and is communicated with the grid-shaped pipe 2 to accommodate water; a ceramic lattice combustion grate 11 is provided along a circumference of an inner side of the tubular barrier 13; a first pipeline 7 is provided at an upper part of the double-walled furnace body to connect the steam outlet of the double-walled furnace body and extends to the lower part of the steam separation-drying device 3; steam is heated, atomized and separated in the steam separation-drying device 3; residual water sinks into the lower part of the double-walled furnace body 1 through a second pipeline 23 to join water in the double-walled furnace body 1; the separated steam with increased level of atomization passes through the interior of the double-walled furnace body through a third pipeline 9. A steam distributor 22 is provided at a tail end of the third pipeline 9 that projects from an outer wall of the lower part of the double-walled furnace body 1. Steam is divided, by the steam distributor 22, into two parts; the first part passes through a fifth pipeline 10 to reach the infrared combustion radiation grid layer 5 and then enters the secondary gasifier 31, and the second part passes through a sixth pipeline 14 to arrive at a lower part of the interior of the double-walled furnace body 1 and then disperses upward inside the interior of the double-walled furnace body 1. A fourth pipeline 27 is provided at the upper part of the interior of the double-walled furnace body to connect a gas outlet which is provided between the inner wall of the double-walled furnace body 1 and an outer wall of the steam separation-drying device 3, and a separator 26 is provided at a lower end of the fourth pipeline 27; a tar and dust discharge pipe 25 is provided at a lower end of the separator 26; a purified gas separation pipe 8 is provided at a side of the separator 26 and extends to a bottom of the steam separation-drying device 3. A second gasifying agent inlet pipe 20 is provided between the infrared combustion radiation grid layer 5 and a bottom of the double-walled furnace body 1, and a gasifying agent is drawn into the second gasifying agent inlet pipe 20 from outside of the lower part of the double-walled furnace body 1 and is heated as it rises through the second gasifying agent inlet pipe 20, and then the heated gasifying agent enters the infrared combustion radiation grid layer 5 and the secondary gasifier 31. A biomass inlet 12 is provided at a lower middle of a sidewall of the double-walled furnace body 1 and above the ceramic lattice combustion grate 11; and an ash outlet 16 is provided at the bottom of the double-walled furnace body 1.

What is claimed is:

1. A hydrogen generation furnace using decomposition of biomass steam, comprising a double-walled furnace body, wherein an opening from which water enters and exits is provided at a lower part of the double-walled furnace body; a steam outlet is provided at a top of the double-walled furnace body; a grid-shaped pipe has a spaced interior and is provided along a circumference of an inner wall of the double-walled furnace body; the grid-shaped pipe is communicated with the double-walled furnace body to accommodate water; an infrared radiation grid layer is embedded between the grid-shaped pipe and the inner wall of the double-walled furnace body; a steam separation-drying device is cylindrical and double-walled and is provided in a middle of an upper part of an interior of the double-walled furnace body; a steam outlet is provided at a top of the steam separation-drying device; a steam inlet and a residual water outlet are provided at a lower part of the steam separation-drying device; a cylindrical infrared radiation grid layer is provided along a circumference of an inner wall of the steam separation-drying device; an infrared combustion radiation grid layer is provided at a lower part of an interior of the steam separation-drying device; a cavity of the steam separation-drying device forms a secondary gasifier; a gas outlet is provided in a middle of a top of the secondary gasifier; a ceramic lattice plate is provided at a bottom of the interior of the double-walled furnace body and has a pyramid in a middle of the ceramic lattice plate; a first gasifying agent inlet pipe is provided under the pyramid of the ceramic lattice plate; a lighter is provided above a vertex of the pyramid; a tubular barrier is provided above the pyramid and is communicated with the grid-shaped pipe to accommodate water; a ceramic lattice combustion grate is provided along a circumference of an inner side of the tubular barrier; a first pipeline is provided at un upper part of the double-walled furnace body to connect the steam outlet of the double-walled furnace body and extends to the lower part of the steam separation-drying device; steam is heated, atomized and separated in the steam separation-drying device; residual water sinks into the lower part of the double-walled furnace body through a second pipeline to join water in the double-walled furnace body; the separated steam with increased level of atomization passes through the interior of the double-walled furnace body through a third pipeline; a steam distributor is provided at a tail end of the third pipeline that projects from an outer wall of the lower part of the double-walled furnace body; a fourth pipeline is provided at the upper part of the interior of the double-walled furnace body to connect a gas outlet which is provided between the inner wall of the double-walled furnace body and an outer wall of the steam separation-drying device, and a separator is provided at a lower end of the fourth pipeline; a tar and dust discharge pipe is provided at a lower end of the separator; a purified gas separation pipe is provided at a side of the separator and extends to a bottom of the steam separation-drying device.

2. The hydrogen generation furnace of claim 1, wherein a second gasifying agent inlet pipe is provided between the infrared combustion radiation grid layer and a bottom of the double-walled furnace body, and a gasifying agent is drawn into the second gasifying agent inlet pipe from outside of the lower part of the double-walled furnace body and is heated as it rises through the second gasifying agent inlet pipe, and then the heated gasifying agent enters the infrared combustion radiation grid layer and the secondary gasifier.

3. The hydrogen generation furnace of claim 1, wherein steam is divided, by the steam distributor, into two parts; the first part passes through a fifth pipeline to reach the infrared combustion radiation grid layer and then enters the secondary gasifier, and the second part passes through a sixth pipeline to arrive at a lower part of the interior of the double-walled furnace body and then disperses upward inside the interior of the double-walled furnace body.

4. The hydrogen generation furnace of claim 1, wherein a biomass inlet is provided at a lower middle of a sidewall of the double-walled furnace body and above the ceramic lattice combustion grate; and an ash outlet is provided at a bottom of the double-walled furnace body.

\* \* \* \* \*